US012307636B2

(12) United States Patent
Verma et al.

(10) Patent No.: US 12,307,636 B2
(45) Date of Patent: May 20, 2025

(54) SPECULAR REFLECTION REDUCTION IN ENDOSCOPE VISUALIZATION

(71) Applicant: Verily Life Sciences LLC, South San Francisco, CA (US)

(72) Inventors: Nishant Verma, Burlingame, CA (US); Brian Anderson, Mountain View, CA (US)

(73) Assignee: Verily Life Sciences LLC, Dallas, TX (US)

(*) Notice: Subject to any disclaimer, the term of this patent is extended or adjusted under 35 U.S.C. 154(b) by 514 days.

(21) Appl. No.: 17/731,127

(22) Filed: Apr. 27, 2022

(65) Prior Publication Data
US 2022/0375043 A1 Nov. 24, 2022

Related U.S. Application Data

(60) Provisional application No. 63/232,089, filed on Aug. 11, 2021, provisional application No. 63/192,497, filed on May 24, 2021.

(51) Int. Cl.
G06T 5/77 (2024.01)
G06T 5/20 (2006.01)
G06T 5/70 (2024.01)

(52) U.S. Cl.
CPC ............... G06T 5/77 (2024.01); G06T 5/20 (2013.01); G06T 5/70 (2024.01); G06T 2207/10016 (2013.01); G06T 2207/10068 (2013.01)

(58) Field of Classification Search
None
See application file for complete search history.

(56) References Cited

U.S. PATENT DOCUMENTS

| 8,145,003 | B2 | 3/2012 | Prakash et al. | |
|---|---|---|---|---|
| 8,605,970 | B2 | 12/2013 | Bar-Aviv et al. | |
| 2008/0205785 | A1* | 8/2008 | Geiger | G06T 5/20 |
| | | | | 382/254 |
| 2011/0305388 | A1* | 12/2011 | Wedi | G06T 5/50 |
| | | | | 382/165 |
| 2015/0348239 | A1* | 12/2015 | Nestares | G06T 5/50 |
| | | | | 382/255 |
| 2017/0046819 | A1 | 2/2017 | Sambongi et al. | |

(Continued)

FOREIGN PATENT DOCUMENTS

| JP | 2001224549 A | * | 8/2001 |
|---|---|---|---|
| WO | 2020025684 A1 | | 6/2020 |

OTHER PUBLICATIONS

Hakamata et al., JP-2001-22459A English Translation, par 0074 (Year: 2001).*

(Continued)

Primary Examiner — Miya J Cato
(74) Attorney, Agent, or Firm — Christensen O'Connor Johnson Kindness PLLC

(57) ABSTRACT

Systems and methods for specular reflection reduction in endoscope visualizations are described. A method includes receiving an image including a region of specular reflection. The method includes detecting the region of specular reflection in the image. The method includes estimating image information for a portion of the region of specular reflection. The method also includes reconstructing the image including the image information populated into the region of specular reflection.

26 Claims, 8 Drawing Sheets

(56) References Cited

U.S. PATENT DOCUMENTS

2017/0084075 A1* 3/2017 Robert ................. G06T 19/006
2024/0346724 A1* 10/2024 Tang ....................... G06T 11/40

OTHER PUBLICATIONS

Karapetyan et al., Automatic Detection and Concealment of Specular Reflections for Endoscopic Images, Ninth International Conference on Computer Science and Information Technologies Revised Selected Papers, IEEE, Sep. 23, 2013, 4 pages.

Stehle, Specular Reflection Removal in Endoscopic Images, Proceedings of the 10th International Student Conference on Electrical Engineering, May 11, 2006, 6 pages.

Van Raad et al., Active Contour Model based Segmentation of Colposcopy Images from Cervix Uteri using Gaussian Pyramids, 6th International Symposium on Digital Signal Processing for Communication Systems, Jan. 2002, 6 pages.

International Search Report and Written Opinion, mailed Sep. 2, 2022, in corresponding International Patent Application No. PCT/US2022/27656, 8 pages.

International Search Report and Written Opinion mailed on Sep. 2, 2022, issued in corresponding International Application No. PCT/US2022/27656, filed on May 4, 2022, 8 pages.

* cited by examiner $$I_s^e(i,j) = \frac{I_s(i,j) * G_\sigma}{H_s(i,j) * G_\sigma}$$

$$= \frac{W_1 I_2 + W_1 I_3 + W_1 I_4 + W_1 I_6 + W_1 I_8 + W_2 I_5 + W_2 I_7}{5W_1 + 2W_2}$$

FIG. 4

SPECULAR REFLECTION REDUCTION IN ENDOSCOPE VISUALIZATION

CROSS-REFERENCE TO RELATED APPLICATIONS

This application claims the benefit of U.S. Provisional Application No. 63/192,497, filed May 24, 2021, and U.S. Provisional Application No. 63/232,089, filed Aug. 11, 2021, the contents both of which are herein incorporated by reference.

TECHNICAL FIELD

This disclosure relates generally to techniques for reducing specular reflection in images, and in particular but not exclusively, relates to real time specular reflection reduction in endoscope images.

BACKGROUND INFORMATION

Endoscopes are routinely used to illuminate and visualize internal anatomy in a wide range of diagnostic and surgical procedures, such as laparoscopy. Endoscopes typically serve both as an illumination source as well as an optical fiber camera, collecting light reflected off the anatomical scene. As a result of collocating the illumination source and the detector surface, specular reflections from anatomical and instrument surfaces are common. Such reflections are distracting, adversely affect the surgeon, and may impair the quality of care.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

FIG. 4 is a schematic diagram illustrating an example approach for weighted extrapolation of image intensity information, in accordance with an embodiment of the disclosure.

DETAILED DESCRIPTION

Figure 1:
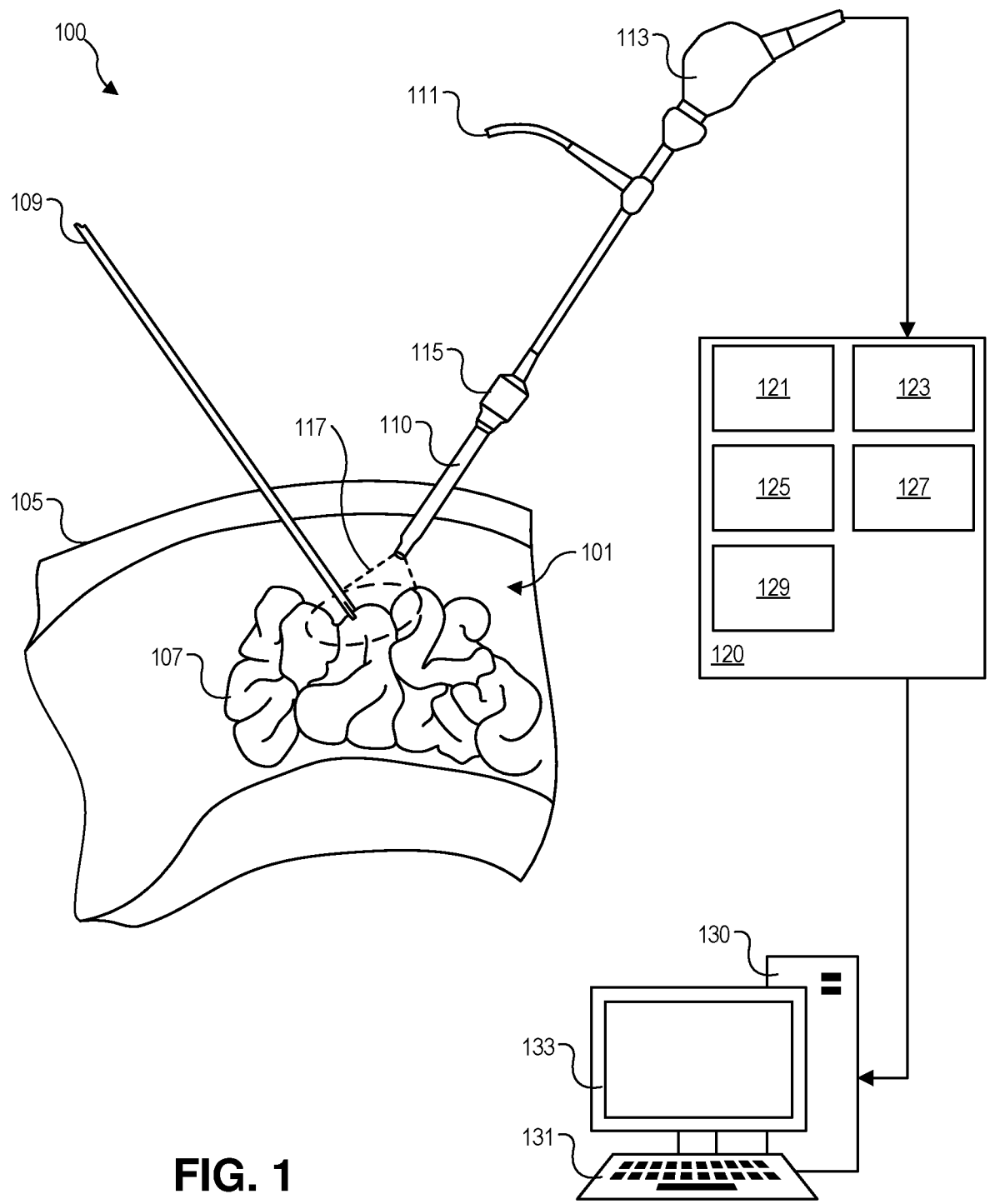
FIG. 1 is a schematic diagram illustrating an example endoscopy system to image an inner space of a biological subject, in accordance with an embodiment of the disclosure.

Embodiments of a system and method for specular reflection reduction in endoscope visualizations are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Specular reflection is mirror-like reflection of electromagnetic radiation, such as visible light, by a reflecting surface. Specular reflection represents a portion of light reflected from the reflecting surface, the other being diffuse reflectance. Specular reflection generally occurs for a broad range of energies, for example, where the reflecting surface includes a population of electrons in a conduction band or otherwise reflects light that reproduces the energy of incident radiation. Importantly, specular reflection typically includes diffuse-reflected light from external reflecting surfaces, rather than describing the reflecting surface itself, most familiarly seen in visible-light mirrors for cosmetic use. In an illustrative example, specular reflection from a surface can create a virtual image of the endoscope illumination source, appearing as a bright spot inside a body cavity. Such external information can cause confusion as to the nature of the reflecting surface and can impair diagnostic procedures, such as colonoscopy.

In an illustrative example, an endoscope used to guide a surgeon during laparoscopic surgery on an internal organ typically illuminates the inner space of a body cavity. The endoscope includes an optical fiber probe coupled with a camera that gives the surgeon a visible image of the body cavity. Wet surfaces of the body cavity can generate specular reflections reflecting broad-spectrum white light from the endoscope that blind the camera and obscure portions of the body cavity from view.

In some embodiments, an endoscopy system includes components that detect and replace specular reflections in the camera field of view with extrapolated intensity information. Extrapolated intensity information generally describes image data that is obscured or absent from an image due to specular reflection. Extrapolation includes techniques for separating higher frequency components from lower frequency components, through defining an image pyramid that includes multiple images at multiple scales. Subsampling and filtering images reduces the prominence of higher frequency components and emphasizes lower frequency components. Examples of lower frequency components include, but are not limited to, background diffuse reflection from surfaces that is descriptive of the material (e.g., biological tissues). Higher frequency components, by contrast, include localized features, such as edges, textures, and/or fine structures (e.g., vascularization).

Operations for detection, extrapolation, and replacement may be applied to a video stream generated by the endoscope camera in real time or near-real time with a limited latency, such that multiple frames of the video stream are processed per second. In this way, the images viewed by the surgeon may present fewer and/or reduced specular reflections, thereby improving the surgeon's ability to perform internal surgery and to conduct diagnostic assessments in the body cavity. Further, replacing specular reflection with extrapolated information may improve diagnostic and surgical outcomes, for example, by permitting a user to view and interact with internal structures free of specular reflection that may dazzle the user or saturate the camera.

While the embodiments described herein focus on visible light, emitted and reflected as photons, typically in a wavelength range from 400 nm to 700 nm, specular reflection can also describe interactions of diverse spectra of electromagnetic ranges. In some embodiments, ultraviolet photons or infrared photons are used, as when imaging in low-light conditions or where the illumination source is invisible to humans. For example, infrared or ultraviolet systems may provide improved image resolution and clarity by reducing the appearance of specular reflections, which cause bloom in images, can saturate an image sensor, or can obscure regions of interest in an image. In an illustrative example, specular reflection reduction may be applied to systems for remote controlled visualization, such as mobile camera platforms configured to explore covered conduits or other low-light areas (e.g., sewers, electricity, or telecommunications conduits).

FIG. 1 is a schematic diagram illustrating an example endoscopy system 100 for imaging an inner space 101 of a biological subject 105, in accordance with an embodiment of the disclosure. Endoscopy system 100 includes an endoscope 110, an image processing module 120, and a computer system 130. Inner space 101 includes organs 107 and surgical tools 109 with wet or reflective surfaces giving rise to specular reflection. Endoscope 110 includes an illumination source 111, a camera 113, and a gas supply 115. Image processing module 120 includes constituent modules, including but not limited to input/output components 121, video processing 123, image binarization 125, image extrapolation 127, and image reconstruction 129. Computer system 130 includes user interface components 131 that permit visualization of the inner space 101 to be presented to a user, which may be the surgeon performing an endoscopic procedure, such as a laparoscopy or a colonoscopy.

In some embodiments, endoscope 110 illuminates inner space 101 of biological subject 105 within a field of view 117 of camera 113. Field of view 117 of camera 113 includes surgical tools 109 that may be metallic or otherwise reflective (e.g., do to having a wet surface) and organs 107 that also exhibit specular reflection. To increase the size of field of view 117, gas supply 115 may be used to inflate biological subject 105 near organs 107, for example, where inner space 101 corresponds to the abdominal cavity or the colon of biological subject 105. Gas from gas supply 115, illumination from illumination source 111, and reflected light from field of view 117 of the camera, may each be carried by endoscope 110 through an entry point in biological subject 105. As an example, for laparoscopic surgery, three incisions may be made into the abdominal cavity of biological subject 105, such that two surgical tools 109 and endoscope 110 may be separately inserted into inner space 101 and may visualize and access the organs 107. In some embodiments, endoscope 110 includes a central optical fiber, a concentric hollow optical fiber around the central optical fiber, and a concentric plenum around the hollow optical fiber to carry gas into inner space 101 from gas supply 115. The concentric arrangement permits illumination from illumination source 111 to be carried into inner space 101, light reflected from organs 107 to be carried back to camera 113, to be processed and visualized during the endoscopic procedure.

As described in more detail in reference to FIGS. 2-8, image processing module 120 may be or include software, general purpose computer hardware, and/or specialized computer hardware to receive images, such as image frames making up a real time video stream, and to process the images to reduce and/or remove specular reflection in real time or near-real time. In the current context, "real time" and "near-real time" describe processing of the video stream that may introduce latency but does not perceptibly reduce frame rate or introduce delay in the video stream to the extent that user experience is impaired. For example, frame rate may be reduced by as much as 5%-10%, and a delay may be introduced of 100 msec or less, 90 msec or less, 80 msec or less, 70 msec or less, 60 msec or less, 50 msec or less, 40 msec or less, 30 msec or less, 20 msec or less, 10 msec or less, 5 msec or less, 1 msec or less, 500 microsec or less, 100 microsec or less, or less.

In an illustrative example of a single image, reducing specular reflection describes multiple operations applied to the image, by which regions of specular reflection are identified and removed from the image. Once removed, the missing information from the image is estimated using peripheral information around the regions of specular reflection. Once the missing information is estimated, an output image is reconstructed using the estimated information in combination with the original image.

Image processing module 120 may be incorporated as one or more electronic components into camera 113 and/or computer system 130. Alternatively, image processing module 210 may be a separate electronic device including input/output components 121 to communicate with camera 113 and/or computer system 130. In some embodiments, image processing module 120 includes one or more processors, a non-transitory computer readable storage medium, and electronic components to facilitate communication between the one or more processors and the storage medium (e.g., a bus). For example, the one or more processors may be or include central processing units (CPUs), graphical processing units (GPUs), or other architectures. In some embodiments, a combination of processor architectures is used as an approach to real time image processing. For example, operations for image binarization 125, image extrapolation 127, and/or image reconstruction 129 may be executed using GPUs to permit pixel-wise processing with RGBA formatted files, as described in more detail in reference to FIG. 8.

Input/output components 121 may include, but are not limited to, electronic communication systems suitable for transfer of high-resolution video streams. For example, universal serial bus (USB), thunderbolt, firewire, HDMI, and/or display port components may carry video streams to/from image processing module 120. Video processing 123, image binarization 125, image extrapolation 127, and image reconstruction 129 describe algorithms stored as software of image processing module 120.

Video processing 123 describes operations on the images generated by camera 113 to segment or otherwise isolate image frames for processing as part of specular reflection reduction. Video processing 123 includes parallelization operations to process individual image frames and reduce potential latency arising from serial operation. Parallelization also may be used to reduce processing time of computationally intensive operations. For example, extrapolation and reconstruction include operations on an image pyramid of multiple images for each image frame of the video stream. In this way, the images making up image pyramid may be processed in parallel, along with multiple image frames being similarly processed in parallel. In some embodiments, video processing 123 includes reformatting images. For example, an image may be received from camera 113 in a first image format, such as an MP4, MOV, WMV, FLV, AVI, or the like. In some embodiments, the images are reformatted into RGBA format, which includes the color triad and an alpha channel. Advantageously, RGBA formatted images may improve processing times for images, by permitting pixel-wise processing by GPUs, as described in more detail in reference to FIG. 8.

Image binarization 125 describes one or more techniques for detecting specular reflection in images. As described in more detail in reference to FIG. 2, regions of specular reflection in an image are characterized by clusters of pixels having intensity near or exceeding a sensor limit of camera 113. In some cases the specular reflection may saturate a region of the sensor, resulting in a solid white region in the image. Image binarization 125 includes algorithms in software for defining a luminance channel of an image and generating a binary mask by comparing luminance values against a luminance threshold. Pixels for which the luminance value satisfies the threshold are labeled with a "true" value, while pixels that do not satisfy the threshold are labeled with a "false" value in the binary mask.

Image extrapolation 127 describes one or more algorithms in software for predicting image intensity information in regions of specular reflection in an image. As described in more detail in reference to FIGS. 3-4, image extrapolation 127 includes two top-level processes. First, an image pyramid representation of the image is generated to represent the image at different spatial scales. Second, image intensity information is extrapolated from the peripheral region around specular reflection regions in the image, for each spatial scale of the image pyramid.

Applying extrapolation techniques to an image pyramid, rather than a single image, improves the accuracy and reliability of extrapolated image intensity information. For example, a base scale (scale "s"=0) of the image pyramid may represent the image received from camera 113. Each subsequent higher level of the image pyramid may be a low-pass filtered image, generated from the preceding level. In this way, high frequency information is progressively reduced with increasing level, to a top level (scale s="S"). While the base scale contains image information at both high and low spatial frequencies, the image at the top level contains low frequency information. Combining low-pass filtering with subsampling permits pixels nearer the center of regions of specular reflection to be reliably extrapolated.

Extrapolation of image intensity information describes a multi-scale process for estimating missing image pixels using pixels for which the luminance channel value satisfied the threshold. As described in more detail in reference to FIG. 4, some embodiments include a weighted approach to extrapolating pixel values. in some embodiments, regions of specular reflection are extrapolated from the periphery of the regions toward the center of the regions. To reduce error and limit the introduction of extrapolation artifacts, the multi-scale approach permits pixels nearer the center of the region to be extrapolated from higher pyramid levels, while pixels nearer the periphery of the region are extrapolated using lower pyramid levels. In this way, higher spatial frequency information, such as edges, smaller structures, or small reflections, is predicted nearer the periphery. Base information, such as material color or larger structures, is predicted with extrapolated data from surrounding larger structures.

Reconstruction 129 describes algorithms in software for recombination of the pyramid levels in a manner reflecting the spatial frequency of the image intensity information described at each respective level. In some embodiments, weighted recombination of images is applied, such that information nearer the center of a region of specular reflection is contributed by the higher pyramid levels (e.g., scale s=S), while information nearer the periphery of the region is contributed by the lower pyramid levels (e.g., scale s=0). Image-wise recombination is described in more detail in reference to FIG. 5 and FIG. 7. In some embodiments, recombination occurs on a pixel-wise basis, such that each pixel is recombined including information for only those pyramid levels for which a threshold alpha value is satisfied. Pixel-wise recombination, for example using RGBA formatted images in a GPU-implementation of example system 100, is described in more detail in reference to FIG. 8.

Computing device 130 may be or include a personal computer, server, edge device, or other electronic device that is configured to interface with endoscope 110, camera 113, and/or image processing module 120. In some embodiments, image processing module 120 is incorporated into computing device 130. For example, computing device 130 may include one or more processors, a non-transitory computer readable memory device, and specialized GPU hardware (e.g., a graphics accelerator). In this way, computing device 130 may be configured to execute the operations of image processing module 120 directly on a video stream received from camera 113. In some embodiments, the interface components 131 include a display 133. Display 133 permits the visualization of the processed video feed. For example, operations by the computing device 130 and/or image processing module 120 may include outputting reconstructed images to display 133. While computing device 130 is illustrated as a standalone device, it is contemplated that operations described in reference to reducing specular reflection may be executed on multiple machines, for example, coordinated over a network. While network communication may introduce some latency into the video stream, access to greater computational resources of a networked system may reduce overall latency and provide near real-time processing of images from the video stream received from camera 113. Furthermore, output operations of image processing module 120 and/or computing device 130 may include communicating processed images or video to multiple electronic devices in one or more physical locations.

Figure 2:
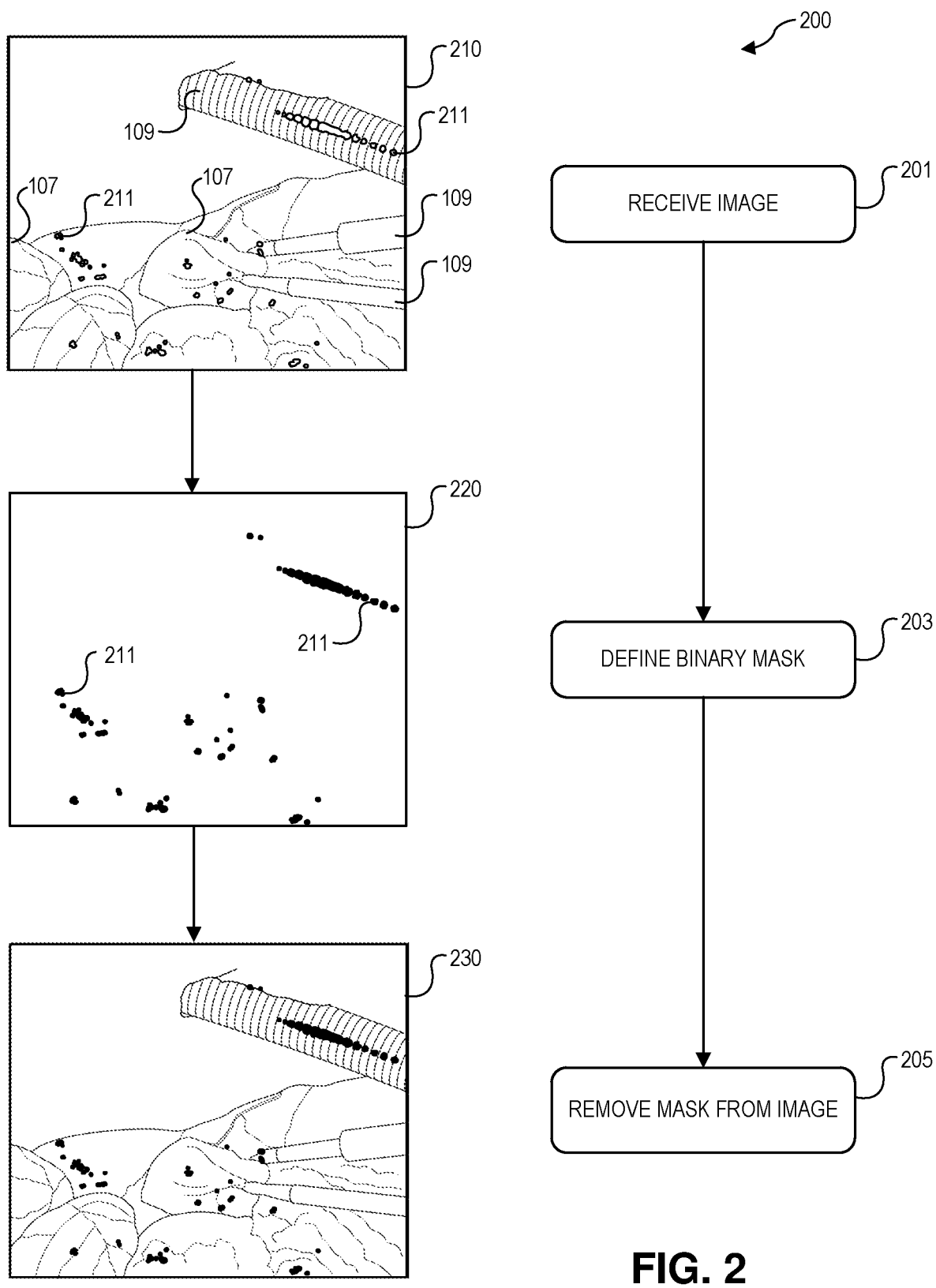
FIG. 2 is a schematic diagram illustrating an example procedure for detecting regions of specular reflection in an endoscope image, in accordance with an embodiment of the disclosure.

FIG. 2 is a schematic diagram illustrating an example procedure 200 for detecting regions of specular reflection in an endoscope image 210, in accordance with an embodiment of the disclosure. Example procedure 200 includes operations for the definition of a binary mask 220 and for the generation of a masked image 230. Example procedure 200 describes operations implemented by image processing module 120 of FIG. 1, and may be executed by one or more processors in accordance with computer readable instructions, as described in more detail in reference to FIG. 1. While operations of example procedure 200 are illustrated in a given order, operations may be omitted or reordered in some embodiments.

At operation 201, endoscope image 210 is received, for example, via input/output components 121 of FIG. 1, or by computing device 130 of FIG. 1. Endoscope image 210 may be generated by camera 113 and may describe field of view 117 of innerspace 101 of biological subject 105, for example, including organs 107 and tools 109. Endoscope image 210 also includes one or more regions of specular reflection 211, illustrated as white regions surrounded by a black outline. As shown, specular reflections 211 obscure the underlying details of the organs 107 and/or tools 109, which may impair the ability of a surgeon to visualize the location of a structure, or the true position of a tool.

At operation 203, binary mask 220 is defined to identify regions of specular reflection 211 in the image. In some embodiments, operation 203 includes defining a luminance channel for the pixels making up the image 210. A pixel-wise luminance channel, $L(i,j)$, may be defined using the equation:

$$L(i,j) = \alpha \times R(i,j) + \beta \times G(i,j) + \gamma \times B(i,j) \qquad (1)$$

where $R(i,j)$, $G(i,j)$, and $B(i,j)$ represent red, green, and blue channels of endoscope image 210, respectively. Additionally, $(\alpha, \beta, \gamma)$ represent proportionality factors that may be predefined or may be dynamically determined, for example, based on metering of light received from endoscope 110. In some embodiments, $(\alpha, \beta, \gamma)$ are equal, but may also be unequal. For example, $(\alpha, \beta, \gamma)$ may be defined as (0.33, 0.33, 0.33). Alternatively, $(\alpha, \beta, \gamma)$ may also be defined as (0.299, 0.587, 0.114). As individual color channels in RGB formatted images range from zero to one, the combination of $(\alpha, \beta, \gamma)$ sums to one in these examples. In this way, the luminance channel ranges from zero to one, as well. Alternative image formats also may be applied to endoscope image 210, depending, for example, on the image format used. In some embodiments, a luminance channel is defined using CIE-lab color space or as the value channel in a hue-saturation-value (HSV) color space.

To define a pixel as belonging to region of specular reflection 211, the luminance channel is compared to a luminance threshold, "T." The luminance threshold may be predefined, for example, 0.5 or greater, 0.6 or greater, 0.7 or greater, 0.8 or greater, or 0.9 or greater. It is understood that setting a higher value for the luminance threshold will reduce the number of pixels and the size of regions of specular reflection 211. Smaller regions improve the performance of the image processing module 120 by limiting the number of pixels to be extrapolated. By contrast, however, a threshold value that is too high will incorrectly classify pixels and undercount the reflection regions. The value for the luminance threshold, therefore, is a balance between accurate identification of regions of specular reflection 211 and reducing latency in the video stream. In some embodiments, the luminance threshold is defined as 0.9, such that all values of the luminance channel equal or exceeding 0.9 are classified as belonging to a region of specular reflection 211.

Based on the comparison to the threshold value, T, binary mask 220, $H(i,j)$, represents a first subset of pixels in the image corresponding to $L < T$ as "true," and represents a second subset of the pixels in the image corresponding to $L > T$ as "false." In mathematical terms, using binary notation, $H(i,j)$ may be represented as a matrix of values where "true" values are represented by one and "false" by zero. As illustrated, binary mask 220 depicts true pixels as white and false pixels as black.

At operation 205, pixels defined as belonging to regions of specular reflection 211 are removed from endoscope image 210. In some embodiments, removing the pixels includes matrix multiplication of endoscope image 210 with binary mask 220. The resulting image retains the original image data from endoscope image 210 where binary mask 220 is "true" and is zero for all pixels where binary mask 220 is false. Pixels in masked image 230 that correspond to a region of specular reflection 211 are candidates for reflection reduction involving estimation of image intensity information based on surrounding regions (e.g., peripheral pixels). In some embodiments, binary mask 220 is not combined with endoscope image 210, but rather is stored with endoscope image in memory and used to generate an image pyramid.

Figure 3:
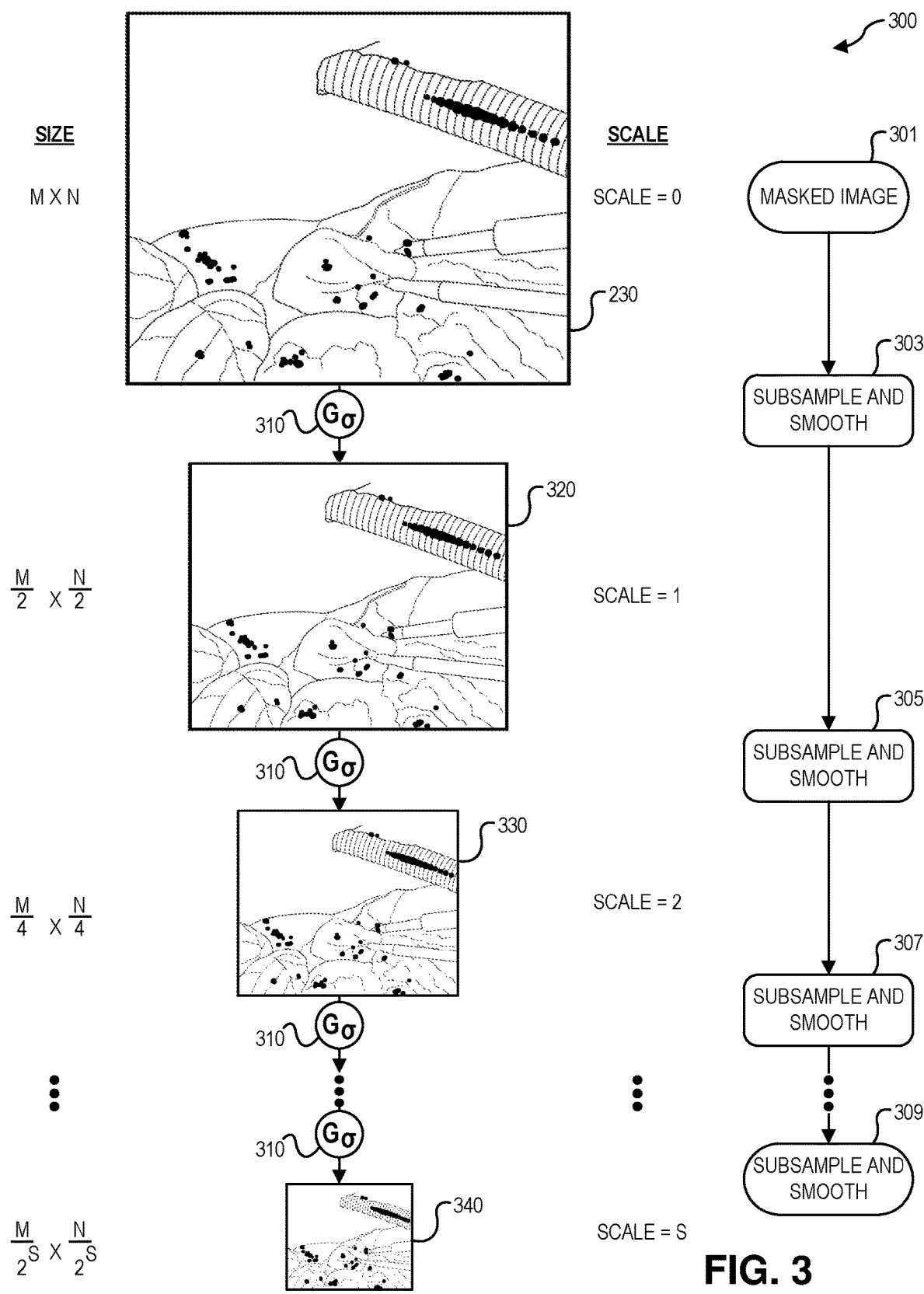
FIG. 3 is a schematic diagram illustrating an example procedure for generating an image pyramid, in accordance with an embodiment of the disclosure.

FIG. 3 is a schematic diagram illustrating an example procedure 300 for generating an image pyramid, in accordance with an embodiment of the disclosure. The image pyramid approach is implemented as a technique for improving accuracy of estimation, to limit the introduction of potentially medically significant information through propagation of high-frequency information, and to limit the latency introduced into video streams. The pyramid representation of masked image 230 starts at operation 301, which includes receiving masked image 230. It is understood that operation 301 may be optional or omitted from example procedure 300 where the binarization and generating the image pyramid are executed in one process. In some embodiments, masked image 230 may be stored in memory and sent to a processor before proceeding with operations for generating the image pyramid. Alternatively, in some embodiments endoscope image 210 is used for example procedure 300, rather than masked image 230. In such cases, both endoscope image 210 and binary mask 220 are subsampled and smoothed as part of example procedure 300.

At operation 303, masked image 230 is subsampled and smoothed to define a scaled image 320 at a higher level of the image pyramid, s=1. Masked image 230 is described by a size M×N, where "M" and "N" are integer values for the number of pixels in masked image 230. Subsampling may use a factor of two in both dimensions, which results in scaled image 320 being of size M/2×N/2. Other sub-sampling approaches are contemplated, based on the initial size of endoscope image 210 and/or the number of levels in the image pyramid. With larger subsampling factors, fewer scales are used, which reduces latency. In contrast, a smaller subsampling factor provides improved extrapolation at more frequency levels but increases resource demand and may slow processing. Furthermore, subsampling factors approaching 1.0 may exhibit limited or negligible improvement over extrapolation directly from endoscope image 210 at scale s=0. In this way, the subsampling factor may be greater than 1.0, 1.5 or greater, 2.0 or greater, 2.5 or greater, 3.0 or greater, 3.5 or greater, or 4.0 or greater.

As part of operation 303, masked image 230 is convolved with a two-dimensional gaussian filter 310 "$G_\sigma$" where "G" describes the gaussian kernel and σ represents the standard deviation of the gaussian filter 310. Gaussian filter 310 acts as a low-pass filter, such that scaled image 320 contains low frequency information from masked image 230. In some embodiments, subsampling is applied to a smoothed image, rather than smoothing a sub-sampled image.

At operation 305, scaled image 320 is similarly subsampled and smoothed using the same sampling factor and the same gaussian filter 310, resulting in a second scaled image 330 that has a size of M/4×N/4 and has been filtered to remove high frequency information from scaled image 320. As with scaled image 320, the sampling factor may be higher or lower than 2.0, but 2.0 is used here as an illustrative example. Similarly, non-gaussian smoothing may be used, rather than gaussian filter 310. Advantageously, gaussian filter 310 is spatially isotropic and may be less likely to introduce artifacts into higher scale images (e.g., s=1 to s=S). As with operation 305, operations 307 and 309 describe subsampling and smoothing applied to the highest scaled image to generate one or more subsequent scaled images 340. The number of scales included in the image pyramid may be defined, may be determined as part of initializing the system, or may be determined based, for example, on the density and/or number of regions of specular reflection 211 in endoscope image 210. While a higher number of scaled images ("S") provides improved extrapolation and improved reduction of specular reflection, larger image pyramids with more levels also increases computational resource demand for extrapolation and reconstruction operations, as described in more detail in reference to FIG. 4-8. In this way, the number of scaled images may be 1 or more, 2 or more, 3, or more, 4 or more, 5 or more, 6 or more, 7 or more, 8 or more, 9 or more, 10 or more, or more. In some embodiments, S=5. The number of scaled images may also depend on the size of endoscope image 210. For example, at scale s=5, a sampling factor of two results in a scaled image 340 of size M/32×N/32 (e.g., M/$2^s$). With each subsequent scaling operation, the frequency content is progressively filtered, which may limit the effectiveness of extrapolation operations beyond a given scale for a given image size. For larger images, however, more pyramid levels may be used. Operations 303, 305, 307, and 309 may be implemented on endoscope image 210 and binary mask 220 directly, rather than using masked image 230. Advantageously, subsampling and smoothing binary mask 220 and endoscope image 210 facilitates extrapolation using matrix techniques described in reference to FIG. 4.

FIG. 4 is a schematic diagram illustrating an example approach for weighted extrapolation of image intensity information, in accordance with an embodiment of the disclosure. Weighted extrapolation is applied to masked image 230 and includes application of matrix operation 400 to masked image 230 and binary mask 220 to prepare a weighted extrapolation on a pixel-wise basis. For a pixel 410, matrix operation 400 is applied to an array of pixels 420 surrounding pixel 410 and for a corresponding region 425 of binary mask 220 ("$H_s$") for the level "s" of an image pyramid having "S" levels. Matrix operation 400 includes weight matrix 430 applied to both array of pixels 420 and corresponding region 425. Weighting the results of matrix operation 400 improves the accordance of the extrapolated value for pixel 410 with neighboring pixels in the image.

Where extrapolation is applied to endoscope image 210, extrapolating image intensity information includes generating a mapping of the region of specular reflection for each level of the image pyramid (e.g., binary mask 220), described in reference to FIG. 3, defining a missing region for each level of the image pyramid using the respective mapping, and extrapolating image intensity information for each missing region.

Matrix operation 400 describes extrapolating image intensity information for pixel 410 for a level "s" of the image pyramid. Generating an extrapolated intensity image, $I_s^e(i,j)$, may be done for the image in accordance with the expression:

$$I_s^e(i, j) = \frac{I_s(i, j) * G_\sigma}{H_s(i, j) * G_\sigma} \quad (2)$$

where $I_s^e$ represents the extrapolated intensity image at level "s" of the image pyramid, where $G_\sigma$ represents a gaussian smoothing kernel of width "σ," and where $H_s(i, j)$ represents the mapping of the region of specular reflection at the level "s" of the image pyramid having "S" levels, wherein "i," "j," "s," and "σ" are numerical values.

Matrix operation 400 is applied to pixels for which the masked image 230 has a value of zero, corresponding to regions of specular reflection 211 in endoscope image 210. Regions of specular reflection correspond to pixels of binary mask 220 that are false, or zero. In this way, pixel 410 has a value equal to the weighted sum of intensity values for each pixel in array of pixels 420, divided by the weighted sum of the true pixels in the corresponding region 425 of binary mask 220. It can be understood from the numerator term of matrix operation 400 that values are contributed by those pixels in endoscope image 210 that are not within region of specular reflection 211. It can be understood from the denominator term of matrix operation 400 that the value of pixel 410 is scaled by the number of pixels in corresponding region 425 of binary mask 220 that are true. In this way, the extrapolated value of pixel 410 is normalized to a value between zero and one, as the range of values for each constituent intensity level (e.g., in RGB format) is from zero to one. As such, matrix operation 400 may be applied separately for each color channel.

In some embodiments, the gaussian smoothing kernel may be the same as gaussian filter 310 described in reference to FIG. 3. Advantageously, applying the same smoothing kernel to image pyramid generation and to matrix operation 400 reduces computational complexity, when a single convolution operation is used for both extrapolation at scale s and for generating pyramid representation at scale s+1 (e.g., extrapolation in scaled image 320 and generating second scaled image 330). Also advantageously, matrix operation 400 recreates missing regions of masked image 230 including both lower frequency information and higher frequency information, including, but not limited to, long edges, corners, or other fine details.

Figure 5A:
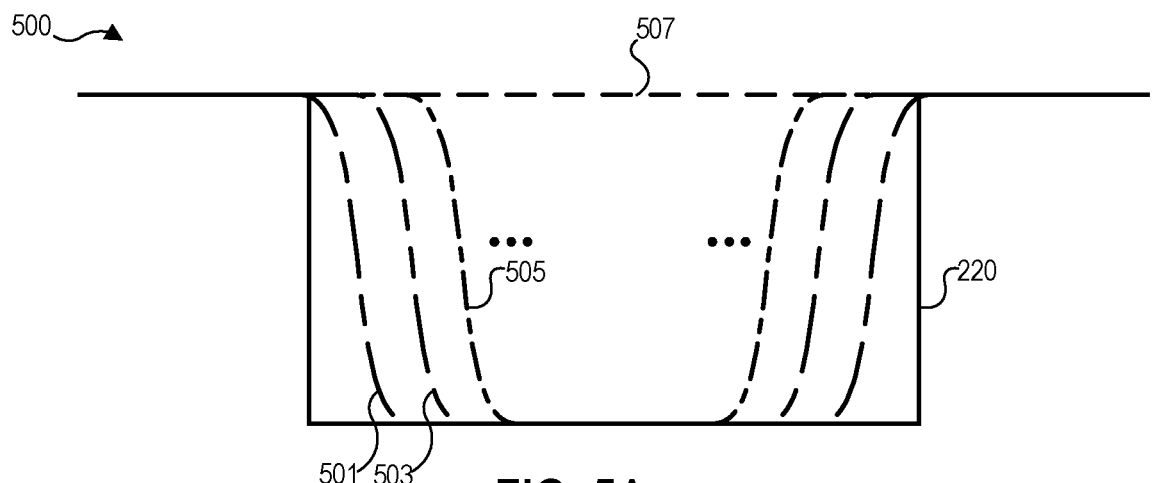
FIG. 5A is an example graph illustrating cumulative weights of levels in an image pyramid having "S" levels, in accordance with an embodiment of the disclosure.
Figure 5B:
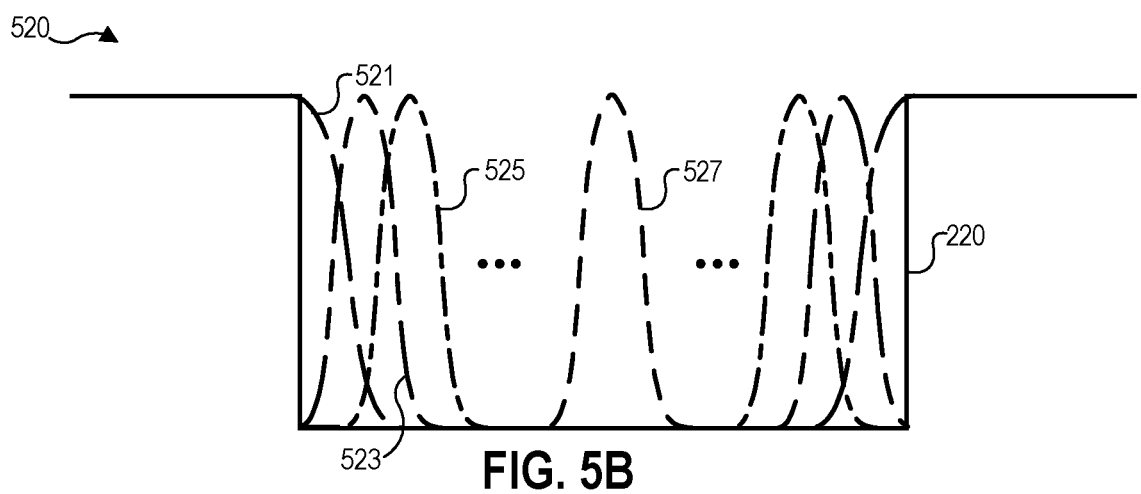
FIG. 5B is an example graph illustrating weights of levels in an image pyramid having "S" levels, in accordance with an embodiment of the disclosure.
Figure 5C:
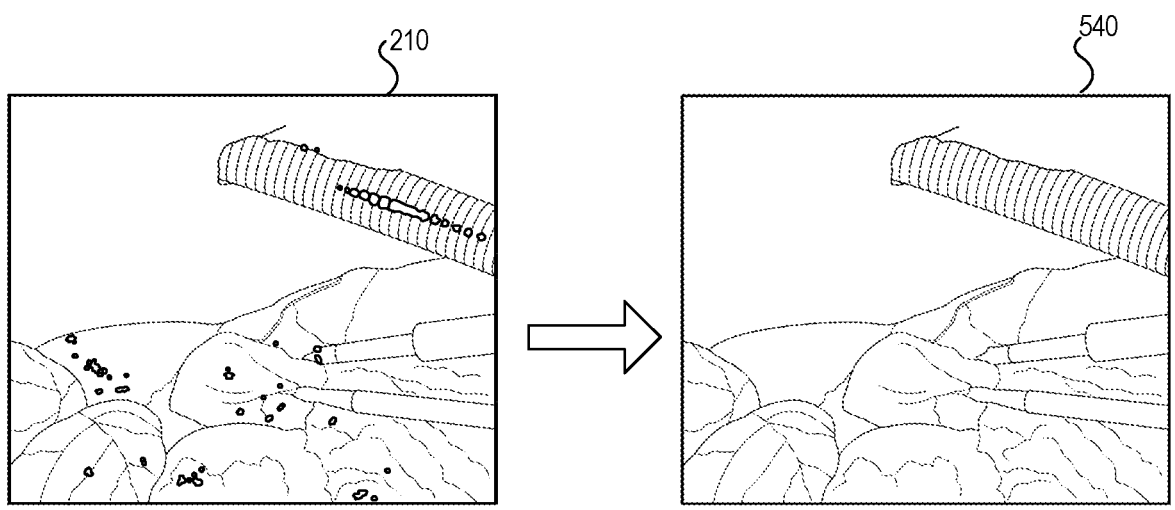
FIG. 5C illustrates an example reconstructed image exhibiting reduced specular reflection, in accordance with an embodiment of the disclosure.

FIG. 5A, FIG. 5B, and FIG. 5C describe reconstruction of extrapolated images on an image-wise basis using weighted reconstruction. Reconstruction includes operations to rescale image pyramid levels to the size (e.g., M×N) of endoscope image 210 (scale s=0) and to weight the values of pixels in regions of specular reflection 211 relative to their proximity to the periphery of the regions. In this way, pixels nearer the center of regions of specular reflection 211 are contributed more by higher levels (e.g., s=S), while pixels nearer the periphery of regions of specular reflection 211 are contributed more by lower levels (e.g., s=1, 2, etc.) of the image pyramid. Advantageously, such an approach improves the reliability of extrapolation by limiting high-frequency information to regions where it is accurately extrapolated, while permitting low-frequency information to guide reconstruction in regions of masked image 230 on a length-scale corresponding to the spatial frequencies described by higher pyramid levels approaching s=S. Where reconstruction is applied on a pixel-wise basis, procedures may be implemented using alpha-channel thresholding as described in reference to FIG. 8.

FIG. 5A is an example graph 500 illustrating cumulative weights of levels in an image pyramid having "S" levels, in accordance with an embodiment of the disclosure. In the example shown, the image pyramid has "S" levels, for which a first cumulative weight image 501, a second cumulative weight image 503, a third cumulative weight image 505, and a final cumulative weight image 507 are shown, relative to binary mask 220, for a region of specular reflection 211.

Example graph 500 demonstrates the relative depth into region of specular reflection 211 at which a given pyramid level contributes extrapolated information. For example, the base level (s=0) corresponding to endoscope image 210 contributes information where binary mask 220 is true. The first pyramid level (s=1), corresponding to scaled image 320, contributes information where first cumulative weight image 501 is greater than zero, in proportion to the value of cumulative weight image 501 between zero and one. Similarly, the top level (s=S) of the image pyramid contributes extrapolated image intensity information across region of specular reflection 211, as illustrated by the value of final cumulative weight image 507 being equal to one for all positions. Advantageously, defining cumulative weight images 501-507 permits extrapolated image intensity information to be included where it is reliable, and does not represent information extrapolated entirely from information absent from endoscope image 210.

A cumulative weight image, $cw_s(i,j)$, may be generated for each level of the image pyramid in accordance with the expression:

$$cw_s(i,j) = ((H_s(i,j)*G_\sigma) > T)*G_\sigma \quad (3)$$

where T is a threshold value representing a reliability of the extrapolated intensity value, below which the value of $cw_s(i,j)$ is set at zero. The reliability factor T limits inclusion of pixels for which extrapolated image intensity information is based too greatly on extrapolated information, rather than on pixels present in endoscope image 210. In this way, artifacts or inaccurate information are reduced, and potentially incorrect diagnostic assessments by the surgeon may be avoided. A lower value of the reliability factor permits more pixels to be included in the cumulative weight image, because it is defined as a threshold below which a pixel is excluded, but also introduces higher-frequency information beyond a spatial position where it may no longer be accurate. A higher value, conversely, reduces the number of pixels that are included. For example, the reliability factor T may be zero, 0.001, 0.01, 0.05, 0.1, 0.2, 0.3, 0.4, 0.5, 0.6, 0.7, 0.8, 0.9, or greater, including fractions and interpolations thereof. At higher values, less information from lower levels is included during reconstruction near the center of region of specular reflection 211. In some embodiments, reliability factor T is set at 0.1, indicating that any pixel for which more than 90% of neighboring pixels include extrapolated information will not be included in reconstruction (e.g., at least 10% of neighboring pixels are outside region of specular reflection 211). Instead, extrapolated image intensity information from higher pyramid levels will be included.

FIG. 5B is an example graph 520 illustrating weight images of levels in an image pyramid having "S" levels, in accordance with an embodiment of the disclosure. Once cumulative weight images $cw_s(i,j)$ are defined for each level of the image pyramid, a weight image, $w_s(i,j)$ may be defined for each level of the image pyramid. For an image pyramid having S levels, a first weight image 521, a second weight image 523, a third weight image 525, and a final weight image 527 are shown for region of specular reflection 211.

Weight images 521-527 define a region within region of specular reflection 211 for which each image pyramid level (s=0 to S) contributes extrapolated image intensity information. In contrast to cumulative weight images 501-507, weight images 521-527 limit the contribution to areas where information is reliable and meaningful. In this way, information for lower pyramid levels, closer to endoscope image 210, which contain higher frequency information, are included for regions nearer the periphery of region of specular reflection 211. Higher pyramid levels, approaching final level "S," contribute information nearer the center of region of specular reflection, but do not contribute information nearer peripheral regions of reconstructed images. Weight images 521-527 may be defined in accordance with the expression:

$$w_s(i,j) = cw_s(i,j) - cw_{s-1}(i,j) \quad (4)$$

where "s" and "s−1" represent consecutive levels of the image pyramid from s=0 to s=S, where s=0 represents endoscope image 210 and where "S" is an integer representing the final level of the image pyramid. In contrast to cumulative weight images, weight images describe the contribution of each level of the image pyramid during reconstruction.

FIG. 5C illustrates an example reconstructed image 540 exhibiting reduced specular reflection, in accordance with an embodiment of the disclosure. Reconstructed image 540 reduces the appearance of regions of specular reflection 211 in endoscope image 210 and reproduces low frequency information and may include some high-frequency information. In some embodiments, once the weight images 521-527 for each level of the image pyramid are defined, reconstructed image 540 "$I_R(i, j)$" is generated by weighted combination of extrapolated images from image pyramid levels s=0 to s=S, in accordance with the expression:

$$I_R(i,j) = \frac{w_0(i,j) \times I_0^e(i,j) + \ldots + w_S(i,j) \times I_S^e(i,j)}{w_0(i,j) + \ldots + w_S(i,j)} \quad (5)$$

where "w" is the weight image and I is the extrapolated image. It is understood that the denominator of the expression serves to normalize the intensity information between a value of zero and one for each pixel of reconstructed image 540.

Once reconstructed image 540 is generated, an output image J(i,j) can be defined using the endoscope image 210 and the reconstructed image, in accordance with the expression:

$$J(i,j) = (1-\varepsilon) \times I(i,j) + \varepsilon \times I_R(i,j) \quad (6)$$

where I(i, j) represents the image and where E represents an extent variable between zero and one. Expression (6) is similar to alpha blending, permitting the extent variable to determine, on an image level or on a pixel level, the extent of information being contributed in the output image "J" from each of reconstructed image 540 "$I_R$" and endoscope image 210 "I." In some embodiments, J is defined as a combination of reconstructed image 540 and masked image 230. Image reconstruction may include dynamic or adaptive blending between reconstructed image 540 and endoscope image 210. For example, blending may include increasing the contribution from reconstructed image 540 near regions of specular reflection 211 while keeping information from endoscope image 210 in regions unaffected by specular reflection.

Figure 6:
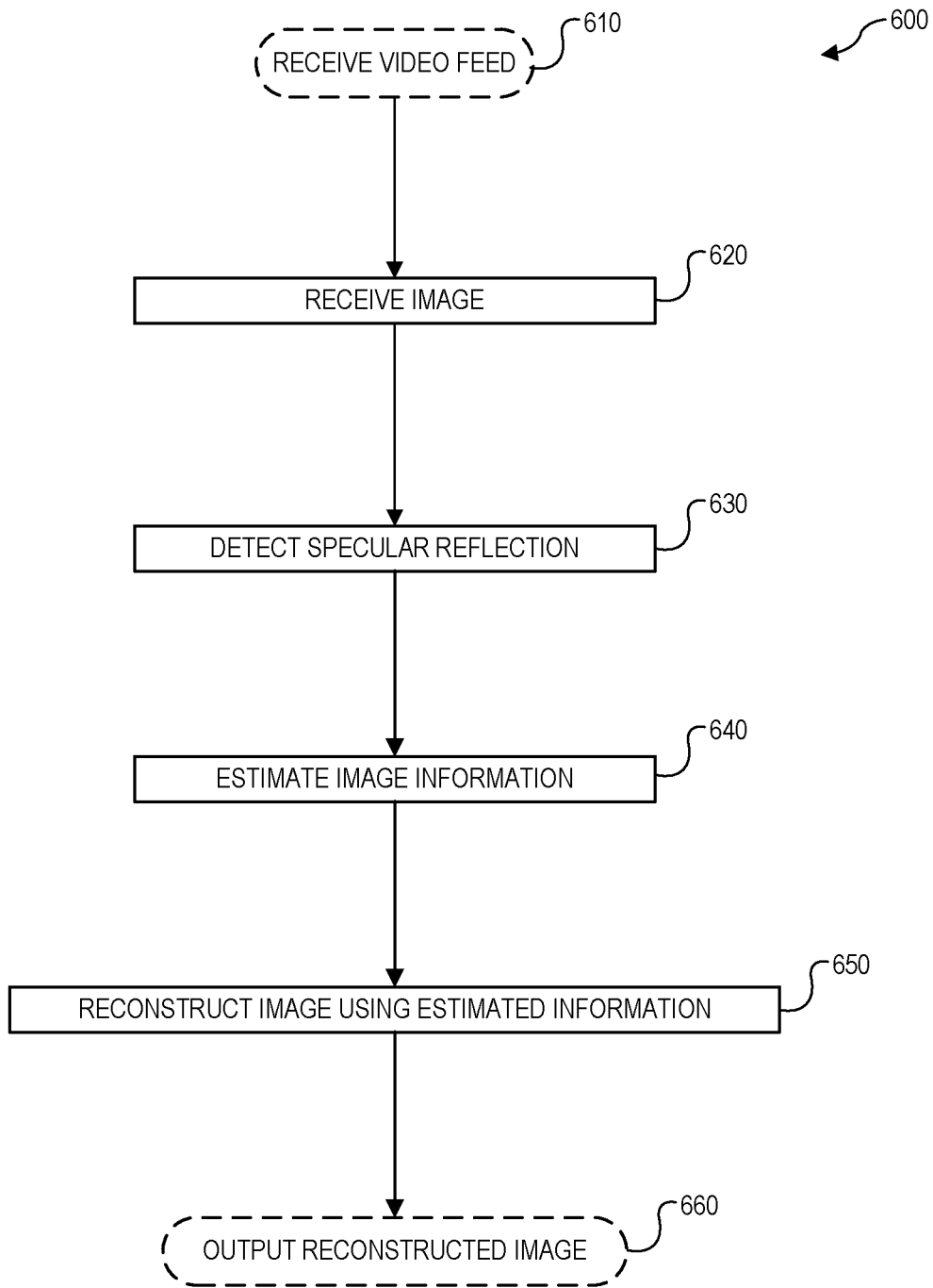
FIG. 6 is a block diagram illustrating an example process for reducing specular reflection in endoscopy images, in accordance with an embodiment of the disclosure.

FIG. 6 is a block diagram illustrating an example process 600 for reducing specular reflection in endoscopy images, in accordance with an embodiment of the disclosure. Example process 600 may describe operations executed by example system 100 of FIG. 1, as part of reducing the appearance of specular reflections in endoscope images. In this way, example process 600 may include the operations described in reference to FIGS. 2-5C and FIGS. 7-8. Other applications of example process 600 are contemplated, including those where reduction of specular reflection in real time would be advantageous. The order in which some or all of the process blocks appear in each process should not be deemed limiting. Rather, one of ordinary skill in the art having the benefit of the present disclosure will understand that some of the process blocks may be executed in a variety of orders not illustrated, or even in parallel.

In some embodiments, example process 600 optionally includes receiving a video feed at process block 610. As described in more detail in reference to FIG. 1, images may be received from camera 113 as part of a video stream including multiple image frames generated according to a frame rate. For example, endoscope camera 113 may generate 18 frames per second, 24 frames per second, 30 frames per second, 40 frames per second, 50 frames per second, 60 frames per second, or more. Process block 610, therefore, may include operations described in reference to input/output components 121 and video processing 123 modules in FIG. 1. In some embodiments, example process 600 includes, as part of process block 610, operations for segmenting or parallelizing image processing operations to reduce the perception of latency.

At process block 620, example process 600 includes receiving an image, such as endoscope image 210 of FIG. 2. Endoscope image 210 includes one or more regions of specular reflection 211. Receiving the image may include accessing the image from a data store. Similarly, where image processing is carried out by a GPU, process block 620 may include communicating image information (e.g., a location of the image in memory) from one processor (e.g., a CPU) to another processor (e.g., a GPU) tasked with performing subsequent operations of example process 600.

At process block 630, example process 600 includes detecting specular reflection in the image received at block 620. As described in more detail in reference to FIG. 2, detecting specular reflection may include defining a luminance channel for the image, comparing luminance channel values on a pixel-wise basis against a luminance threshold, and defining binary mask 220 based on the comparison. The luminance threshold may be defined as a value between zero and one, corresponding to intensity values used to define colors in images (e.g., RGB, CMYK, etc.). Specular reflection may be defined by identifying pixels for which the luminance channel value exceeds the luminance threshold. In an illustrative example, the luminance threshold may be 0.9, such that pixels having a luminance value above 0.9 are attributed to region of specular reflection 211. Advantageously, defining specular reflection by luminance thresholding, rather than by more computationally intensive techniques such as edge-detection or feature tracking, may reduce latency introduced to video streams.

At process block 640, image intensity information for region of specular reflection 211 are estimated. As described in more detail in reference to FIGS. 3-4, estimation of image intensity information includes replacing at least a portion of specular reflection with extrapolated image information. To improve accuracy, to reduce propagation of artifacts, and to provide an intuitive and natural result in reconstructed images (e.g., reconstructed image 540 of FIG. 5), estimation operations include defining an image pyramid of multiple levels, as described in more detail in reference to FIG. 3. The image pyramid may be defined by a series of smoothing and sub-sampling operations, resulting in a pyramid of "S" levels, with "S" images of progressively decreasing size. The application of gaussian smoothing kernel 310 during definition of the image pyramid serves to filter higher frequency information and to retain lower frequency information in higher levels of the image pyramid. For example, masked image 230 is filtered to reduce higher frequency information in scaled image 320, which is in turn filtered to remove higher frequency information from second scaled image 330. With the images, binary mask 220 is similarly subsampled and smoothed to define a mask pyramid.

Subsequent defining the image pyramid, image intensity information is extrapolated at each level of the pyramid (e.g., s=0 to s=S), whereby values for missing pixels (corresponding to "true" values in binary mask 220) are extrapolated using weighted estimation, as described in reference to FIG. 4. For example, expression (2) describes an approach for estimating image intensity information, on a pixel-wise basis, for an image of an image pyramid. The level, "s" describes the general formulation of the expression for any level of the image pyramid, from s=0 to s=S, where "S" is an integer corresponding to the final level of the image pyramid (e.g., 5 levels, 6 levels, 7 levels, 8 levels, etc.). In this way, extrapolation involves a weighted combination of neighboring pixels outside region of specular reflection 211 that contain image intensity information, normalized for the number of pixels being added, such that the resulting extrapolated image intensity values fall between zero and one. For multi-color images (e.g., RBG, CMYK, etc.) each color channel may be extrapolated individually or together.

At process block 650, a reconstructed image (e.g., reconstructed image 540 of FIG. 5C) is generated using extrapolated image intensity information from multiple levels of the image pyramid defined at process block 640. In some embodiments, reconstructing an image is done on an image-wise basis, by defining weight images for each level, and rescaling both the pyramid images and the weight images to the original size of endoscope image 210. In this way, reconstructed image 540 is generated by weighted combination of pyramid images, with higher level images contributing extrapolated image information nearer the center of regions of specular reflection 211 and lower level images contributing extrapolated image information nearer the peripheries of regions of specular reflection 211. In some embodiments, reconstruction is done on a pixel-wise basis, as described in more detail in reference to FIG. 8. Pixel-wise reconstruction may be optimized for use on GPUs, for example, through defining image pyramid levels as texture objects in RGBA format, incorporating binary mask 220 as an alpha channel in the images making up the image pyramid.

Subsequent reconstruction, example process 600 may optionally include outputting the reconstructed image at process block 660. Outputting operations may include, but are not limited to, generating a visualization of reconstructed image 540 on a display, such as a monitor (e.g., display 133 of FIG. 1). Output may also include communicating reconstructed image 540 to an external system (e.g., over a network connection) for streaming to a remote location.

In some embodiments, the operations of example process 600 are performed repeatedly in parallel for multiple images from a video stream. To reduce latency and permit specular reflection reduction in near real time, processes and/or subprocesses of example process 600 may be parallelized. For example, extrapolation operations may be parallelized, such that each level of the image pyramid are processed in parallel. Similarly, multiple images form the video stream may be processed by parallel instances of example process 600. In some embodiments, outputting operations include storing reconstructed image 540 in a data store. For example, where example process 600 is parallelized to reduce latency in real time processing, subsequent operations may include reconstructing the video stream received at process block 610, for example, by making reference to sequence indicators in image file metadata.

Figure 7:
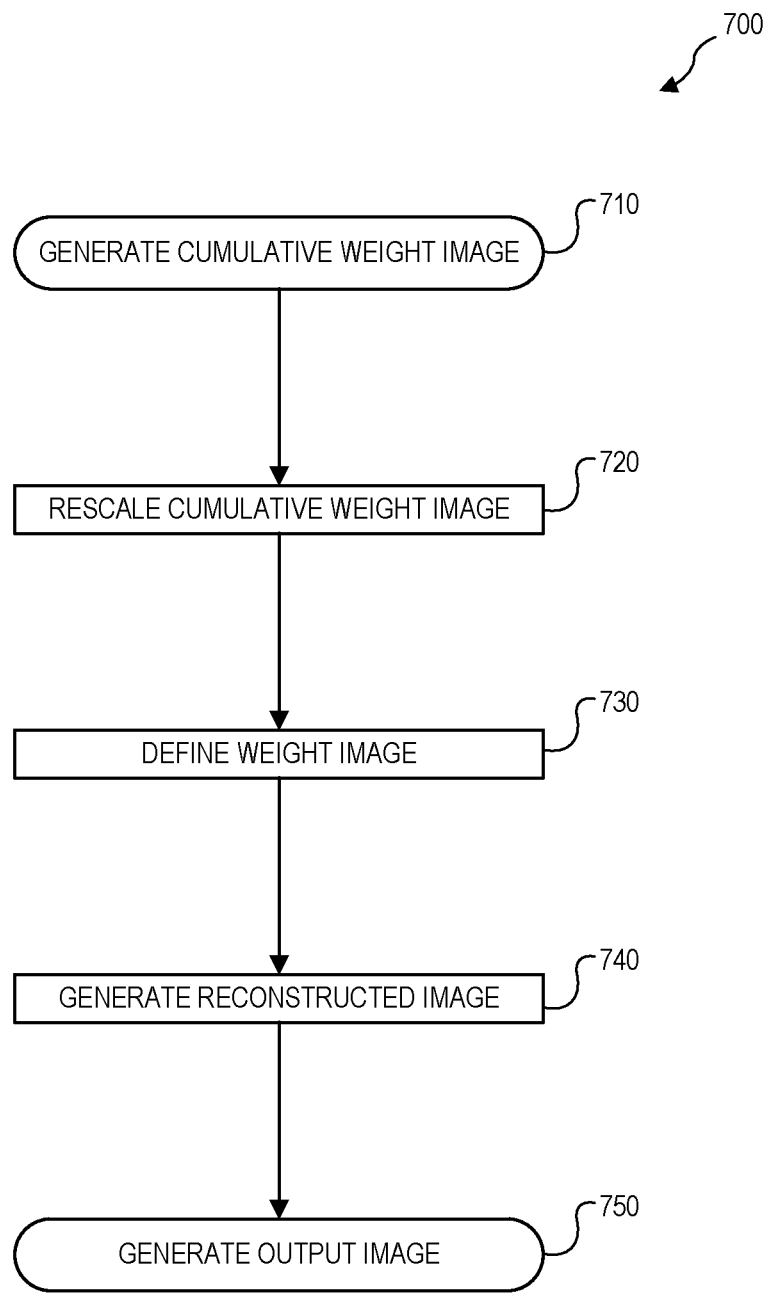
FIG. 7 is a block diagram illustrating an example process for reconstructing an output image on an image-wise basis, in accordance with an embodiment of the disclosure.

FIG. 7 is a block diagram illustrating an example process 700 for reconstructing an output image on an image-wise basis, in accordance with an embodiment of the disclosure. Example process 700 is an example of subprocesses of example process 600, described in reference to FIG. 6. In particular, example process 700 describes operations of process block 650, as described in more detail in reference to FIG. 5A-FIG. 5C. For example, example process 700 may be applied to extrapolated images of an image pyramid to generate reconstructed image 540 of FIG. 5C. As with example process 600 of FIG. 6, The order in which some or all of the process blocks appear in each process should not be deemed limiting. Rather, one of ordinary skill in the art having the benefit of the present disclosure will understand that some of the process blocks may be executed in a variety of orders not illustrated, or even in parallel.

At process block 710, cumulative weight images (e.g., cumulative weight images 501-507 of FIG. 5A) are defined for the image pyramid. Cumulative weight images describe reliability conditions for reconstruction, whereby information that is too far removed from image intensity information in endoscope image 210. For example, inclusion or exclusion of a pixel from a cumulative weight image may be determined in reference to a reliability factor, for example, pixels for which fewer than 10% of neighboring pixels are outside region of specular reflection. As described in more detail in reference to FIG. 3, higher levels of the image pyramid (e.g., for values of "s" approaching final level s=S) include smaller regions of specular reflection (e.g., smaller by a factor of $2^s$ for subsampling by a factor of two). In this way, pixels (e.g., pixel 410 of FIG. 4) nearer the center of region of specular reflection 211 are more reliable for higher levels of the image pyramid.

Subsequent defining cumulative weight images, each cumulative weight image is rescaled to the size of endoscope image 210 at process block 720. Rescaling permits cumulative weight images to be combined at process block 730 as part of defining a weight image for each level of the image pyramid. For example, expression (4), as described in more detail in reference to FIG. 5B, describes an approach for determining weight images from scaled cumulative weight images.

At process block 740, weight images are combined with extrapolated image information to generate a reconstructed image (e.g., reconstructed image 540 of FIG. 5). Reconstruction, as described in expression (5) in reference to FIG. 5C, includes weighting the result of combination of extrapolated image intensity information and normalizing the resulting combination by weighted combination with binary mask 230 at each level, on an image-wise basis.

Subsequent reconstruction, an output image is generated by weighted blending of the original endoscope image (e.g., endoscope image 210 of FIG. 2) and reconstructed image (e.g., reconstructed image 540 of FIG. 5C). In some embodiments, blending may be dynamically defined by comparing a luminance value for a pixel from region of specular reflection 211 against a luminance threshold, as described in more detail in reference to FIG. 2. The output image may be presented as part of a video stream after stream assembly operations, for example, via display 133.

Figure 8:
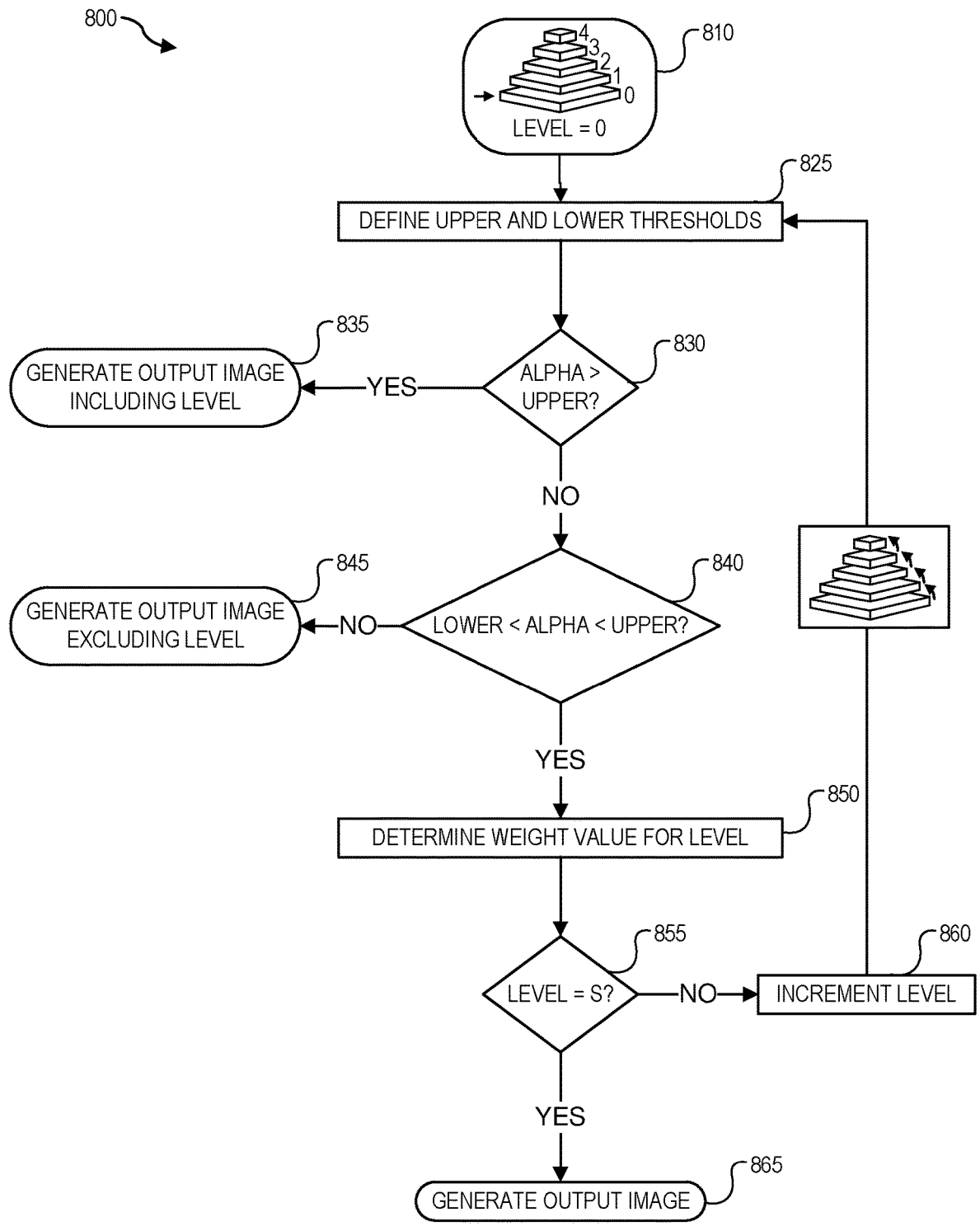
FIG. 8 is a block diagram illustrating an example process for reconstructing an output image on a pixel-wise basis, in accordance with an embodiment of the disclosure.

FIG. 8 is a block diagram illustrating an example process 800 for reconstructing an output image on a pixel-wise basis, in accordance with an embodiment of the disclosure. Example process 800 is an example of subprocesses of example process 600, described in reference to FIG. 6. In particular, example process 800 describes operations of process block 650, optimized for pixel-wise processing by a GPU, using texture objects (e.g., as RGBA objects). As such, example process 800 may include one or more preliminary operations for generating a texture object for each image of the image pyramid being extrapolated and reconstructed. As with FIGS. 6-7, the order in which some or all of the process blocks appear in each process should not be deemed limiting. Rather, one of ordinary skill in the art having the benefit of the present disclosure will understand that some of the process blocks may be executed in a variety of orders not illustrated, or even in parallel.

Pixel-wise reconstruction describes operations whereby pixels (e.g., pixel 510 of FIG. 5A) are included in reference to paired threshold parameters for each layer of an image pyramid 810. In this way, example process 800 includes, starting with base layer s=0 of image pyramid 810, defining an upper threshold parameter "$T_{UPPER}$" and a lower threshold parameter "$T_{LOWER}$" for the layer being referenced. Where the image at scale s=0 is encoded as an RGBA object, A represents the alpha channel encoding information from binary mask 220. The alpha value may be defined by a product of binary mask 220 with gaussian smoothing kernel 310. Based on the value of the alpha channel value relative to the two thresholds, a pixel will be included in reconstruction or will be excluded from reconstruction.

Example process 800 includes decision block 830, where the alpha value is compared to the upper threshold, $T_{UPPER}$. Where the alpha value for the pixel is greater than $T_{UPPER}$, the pixel is included directly in reconstructed image with information from lower levels at process block 835, without considering higher levels of image pyramid 810. Where the output of decision block 830 is false, example process 800 includes decision block 840, where the alpha value is compared to lower threshold $T_{LOWER}$. Where the output of decision block 840 is false, example process 800 includes process block 845, whereby reconstructed image is generated excluding the pixel and corresponding pixels from higher levels of image pyramid 810. For a value of the alpha channel being between $T_{UPPER}$ and $T_{LOWER}$ the pixel is included in reconstruction, being weighted by a weight value.

At process block 850, weight value $w_s(i,j)$ is determined in accordance with the expression:

$$w_S(i, j) = \frac{H_S(i, j) * G_\sigma - t_{lower}}{t_{upper} - t_{lower}} \quad (7)$$

where $G_\sigma$ represents a gaussian smoothing kernel of width $\sigma$, and where $H_s(i, j)$ represents the mapping at the level "s" of the image pyramid, wherein "i," "j," "s," and "σ" are numerical values.

Following determination of the weight value at process block 850, example process 800 includes decision block 855, whereby the layer number is compared to the number of levels in image pyramid 810 (e.g., s=S). In FIG. 8, image pyramid 810 is illustrated having four levels (e.g., S=4), such that decision block 855 includes comparing the pyramid level to S=4. Where the layer is lower than S, example process 800 includes incrementing the pyramid level to a higher level and repeating process blocks 825-855. Where decision block 855 is true, example process includes generating a reconstructed pixel using weighted pixel values for each level included in the reconstruction.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. At least one non-transitory machine-accessible storage medium storing instructions that, when executed by a machine, will cause the machine to perform operations comprising:
   receiving an image including a region of specular reflection;
   detecting the region of specular reflection in the image;
   estimating image information for a portion of the region of specular reflection, wherein the image information is extrapolated from peripheral pixels within a peripheral region surrounding the region of specular reflection and wherein the image information extrapolated from the peripheral pixels includes higher and lower frequency components; and
   reconstructing the image with the image information populated into the region of specular reflection by reconstructing a central portion of the region of specular reflection based on less of, or a lower weighting of, the higher frequency components than used to reconstruct a peripheral portion of the region of specular reflection.

2. The at least one non-transitory machine-accessible storage medium of claim 1, wherein reconstructing the image comprises replacing the specular reflection with the image information in the region.

3. The at least one non-transitory machine-accessible storage medium of claim 1, wherein receiving the image comprises receiving a video stream comprising a plurality of video frames including the image.

4. The at least one non-transitory machine-accessible storage medium of claim 3, wherein the receiving, the detecting, the estimating, and the reconstructing are performed in real-time for each video frame of the plurality of video frames while displaying the video stream.

5. The at least one non-transitory machine-accessible storage medium of claim 1, wherein estimating image information comprises:
   generating an image pyramid comprising a plurality of levels; and
   extrapolating image intensity information for each level of the image pyramid.

6. The at least one non-transitory machine-accessible storage medium of claim 5, wherein generating the image pyramid comprises:
   applying a low-pass filter to a first level of the image pyramid to generate a filtered image; and
   sub-sampling the filtered image to generate a downscaled image at a second level of the image pyramid.

7. The at least one non-transitory machine-accessible storage medium of claim 5, wherein extrapolating image intensity information for each level of the image pyramid comprises:
   generating a mapping of the region of specular reflection for each level of the image pyramid;
   defining a missing region for each level of the image pyramid using the respective mapping; and
   extrapolating image intensity information for each missing region.

8. The at least one non-transitory machine-accessible storage medium of claim 5, wherein extrapolating image intensity information comprises, for a level "s" of the image pyramid:
   generating an extrapolated intensity image, $I_s^e(i, j)$, in accordance with the expression $$I_s^e(i, j) = \frac{I_s(i, j) * G_\sigma}{H_s(i, j) * G_\sigma}$$

where $I_s^e$ represents the extrapolated intensity image at level "s" of the image pyramid, where $G_\sigma$ represents a gaussian smoothing kernel of width "σ," and where $H_s(i, j)$ represents the mapping of the region of specular reflection at the level "s" of the image pyramid having "S" levels, wherein "i," "j," "s," "σ," and "S" are numerical values.

9. The at least one non-transitory machine-accessible storage medium of claim 1, wherein reconstructing the image comprises:

defining a weight image for each of "S" extrapolated intensity images;
generating a reconstructed image by weighted combination of the extrapolated intensity images; and
generating an output image using the image and the reconstructed image.

10. The at least one non-transitory machine-accessible storage medium of claim 9, wherein defining the weight image for an extrapolated intensity image comprises:
generating a cumulative weight image for each of the S extrapolated intensity images;
rescaling each cumulative weight image to a size of the image; and
combining the rescaled cumulative weight images.

11. The at least one non-transitory machine-accessible storage medium of claim 1, wherein estimating the image information comprises:
generating an RGBA image from the image, wherein "R," "G," and "B," represent red, green, and blue color channels, respectively, wherein A represents an alpha channel.

12. The at least one non-transitory machine-accessible storage medium of claim 11, wherein reconstructing the image comprises, for an image pyramid of "S" levels:
defining an upper threshold, $T_{UPPER}$ and a lower threshold, $T_{LOWER}$; and
on a pixel-wise basis, for a value of the alpha channel being between $T_{UPPER}$ and $T_{LOWER}$, determining a weight value for a level "s" of the pyramid and incrementing to a next lower level "s+1" of the image pyramid; or
for the value of the alpha channel being greater than $T_{UPPER}$, combining image intensity information for each level of the image pyramid from a base level "0" to the level "s" of the image pyramid; or
for the value of the alpha channel being less than $T_{LOWER}$, combining image intensity information for each level of the image pyramid from a base level to a level preceding the level "s" in the image pyramid.

13. The at least one non-transitory machine-accessible storage medium of claim 1, wherein detecting the region of specular reflection comprises:
defining a pixel-wise luminance channel for the image;
comparing the luminance channel to a luminance threshold and
defining a binary mask for the image using the comparison.

14. The at least one non-transitory machine-accessible storage medium of claim 1, wherein the image describes an inner space of a biological subject and wherein the image is captured by an endoscope.

15. The at least one non-transitory machine-accessible storage medium of claim 1, wherein the instructions, when executed by the machine, cause the machine to perform further operations comprising:
outputting the reconstructed image to a display electronically coupled with the machine.

16. A computer-implemented method for reducing specular reflection in endoscopy images, the method comprising:
receiving an image including a region of specular reflection;
detecting the region of specular reflection in the image;
estimating image information for a portion of the region of specular reflection, wherein the image information is extrapolated from peripheral pixels within a peripheral region surrounding the region of specular reflection and wherein the image information extrapolated from the peripheral pixels includes higher and lower frequency components; and
reconstructing the image with the image information populated into the region of specular reflection by reconstructing a central portion of the region of specular reflection based on less of, or a lower weighting of, the higher frequency components than used to reconstruct a peripheral portion of the region of specular reflection.

17. The method of claim 16, wherein reconstructing the image comprises replacing the specular reflection with the image information in the region.

18. The method of claim 16, wherein receiving the image comprises receiving a video stream comprising a plurality of video frames including the image.

19. The method of claim 18, wherein the receiving, the detecting, the estimating, and the reconstructing are performed in real-time for each video frame of the plurality of video frames while displaying the video stream.

20. The method of claim 16, wherein estimating image information comprises:
generating an image pyramid comprising a plurality of levels; and
extrapolating image intensity information for each level of the image pyramid.

21. The method of claim 20, wherein generating the image pyramid comprises:
applying a low-pass filter to a first level of the image pyramid to generate a filtered image; and
sub-sampling the filtered image to generate a downscaled image at a second level of the image pyramid.

22. The method of claim 20, wherein estimating image information comprises:
generating a mapping of the region of specular reflection for each level of the image pyramid;
defining a missing region for each level of the image pyramid using the respective mapping; and
extrapolating image intensity information for each missing region.

23. The method of claim 20, wherein extrapolating image intensity information comprises, for a level "s" of the image pyramid:
generating an extrapolated intensity image, $I_s^e(i, j)$, in accordance with the expression $$I_s^e(i, j) = \frac{I_S(i, j) * G_\sigma}{H_S(i, j) * G_\sigma}$$

where $I_s^e$ represents the extrapolated intensity image at level "s" of the image pyramid, where $G_\sigma$ represents a gaussian smoothing kernel of width "σ," and where $H_s(i, j)$ represents the mapping of the region of specular reflection at the level "s" of the image pyramid having "S" levels, wherein "i," "j," "s," "σ," and "S" are numerical values.

24. The method of claim 20, wherein reconstructing the image comprises, for "S" extrapolated intensity images:
defining a weight image for each level of the image pyramid;
generating a reconstructed image by weighted combination of the extrapolated intensity images; and
generating an output image using the image and the reconstructed image.

25. The method of claim 16, wherein estimating the image information comprises:
  generating an RGBA image from the image, wherein "R," "G," and "B," represent red, green, and blue color channels, respectively, and wherein A represents an alpha channel.

26. The method of claim 25, wherein reconstructing the image comprises, for an image pyramid of "S" levels:
  defining an upper threshold, $T_{UPPER}$ and a lower threshold, $T_{LOWER}$; and
  on a pixel-wise basis, for a value of the alpha channel being between $T_{UPPER}$ and $T_{LOWER}$, determining a weight value for a level "s" of the pyramid and incrementing to a next lower level "s+1" of the image pyramid; or
  for the value of the alpha channel being greater than $T_{UPPER}$, combining image intensity information for each level of the image pyramid from a base level "0" to the level "s" of the image pyramid; or
  for the value of the alpha channel being less than $T_{LOWER}$, combining image intensity information for each level of the image pyramid from a base level to a level preceding the level "s" in the image pyramid.

* * * * *